H. MARCUS.
CONVEYING MECHANISM.
APPLICATION FILED AUG. 24, 1911.
1,160,427.
Patented Nov. 16, 1915.
2 SHEETS—SHEET 1.
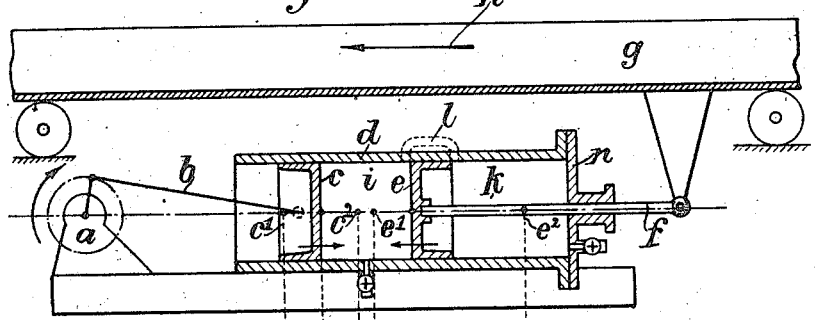
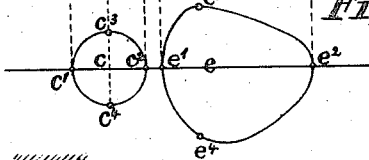
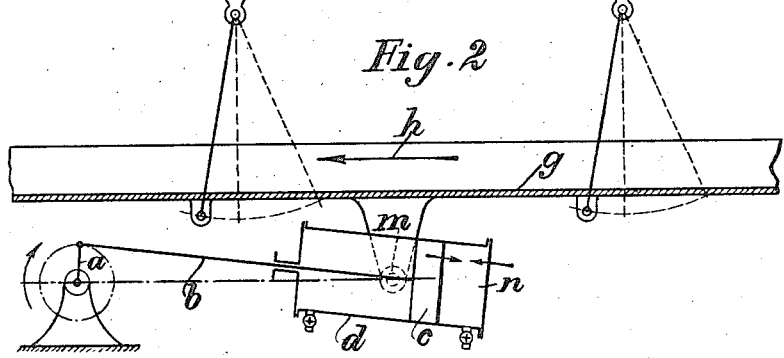
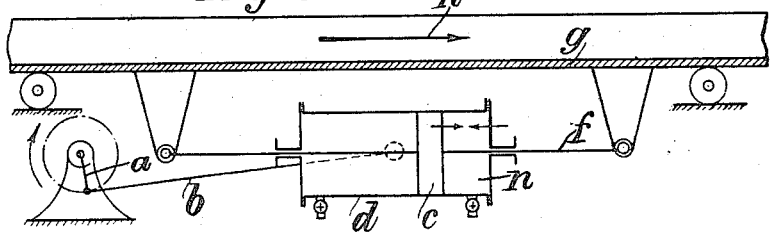
Witnesses:
John C. Sanders
Leon Spring
Inventor:
Hermann Marcus
BY Wm. Wallace White
ATTY H. MARCUS.
CONVEYING MECHANISM.
APPLICATION FILED AUG. 24, 1911.
1,160,427.
Patented Nov. 16, 1915.
2 SHEETS—SHEET 2.
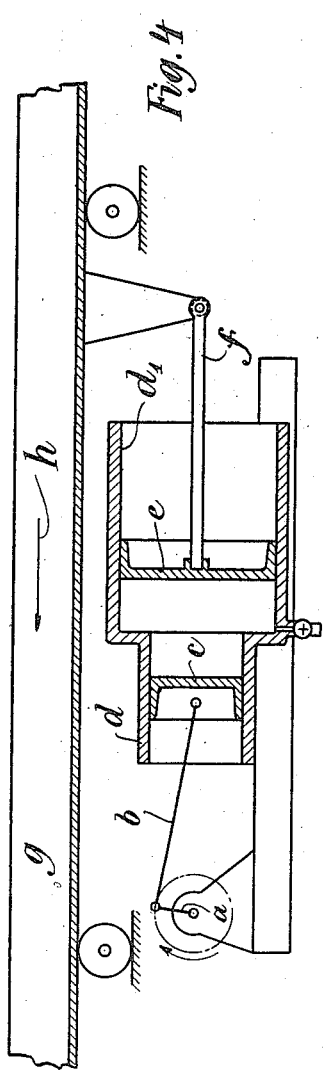
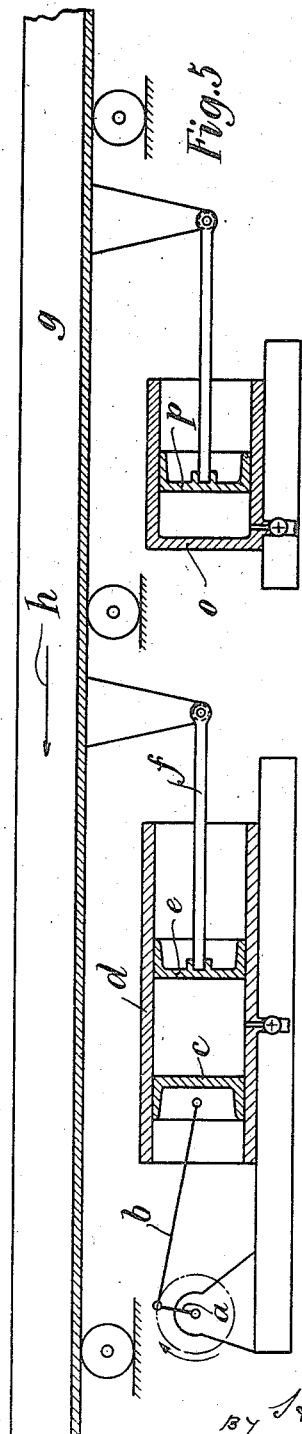
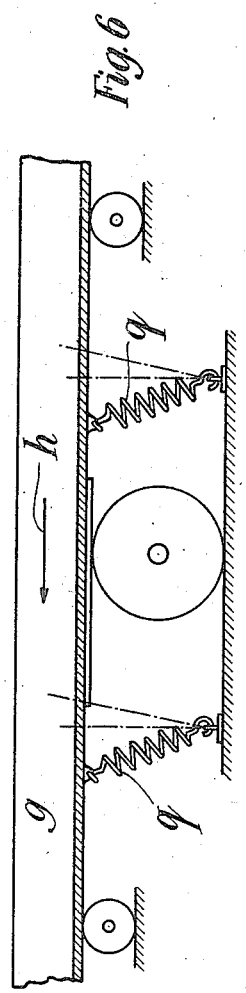
Witnesses
John C. Sanders
Albert F. Houman
Inventor
Hermann Marcus
By Wm Wallace White
Atty.

UNITED STATES PATENT OFFICE.

HERMANN MARCUS, OF COLOGNE, GERMANY.

CONVEYING MECHANISM.

1,160,427.

Specification of Letters Patent. Patented Nov. 16, 1915.

Application filed August 24, 1911. Serial No. 645,772.

*To all whom it may concern:*

Be it known that I, HERMANN MARCUS, a subject of the German Emperor, residing at Gereonshaus, Cologne - on - the - Rhine, Germany, have invented new and useful Improvements in Conveying Mechanism, of which the following is a specification.

This invention relates to a novel driving arrangement for conveyers or conveying troughs, which is characterized by a surprising simplicity of construction and by a very favorable conveying action. According to this invention a piston is so reciprocated within an air-charged cylinder as to produce air cushions which transmit the movement to the conveying trough with a corresponding increase of stroke and displacement of phase. Either the piston which is driven by a crank gear may be moved within the cylinder, or inversely the cylinder may be moved with regard to the piston which is rigidly connected to the conveying trough. In either case the effect of this air cushion driving arrangement is that on the one hand the conveying trough performs a substantially greater throw than the driving crank, and on the other hand that by the expansion and compression of the air cushions a considerable phase displacement is effected between these two movements, whereby, as will hereinafter be more fully explained, the conveying action is exercised in a determined direction.

Several constructional forms of the invention are shown by way of example in the accompanying drawing.

Figure 1 is a vertical longitudinal section illustrating the invention. Fig. 1$^a$ is a diagrammatic view. Fig. 2 is a vertical longitudinal section showing a modified form of the invention. Fig. 3 is a view similar to Fig. 2 showing another modification. Fig. 4 is a view similar to Fig. 1 showing another form. Fig. 5 is a view similar to Fig. 1 showing still another form. Fig. 6 is a vertical longitudinal section showing another modification of the invention.

According to Fig. 1, a piston $c$ is reciprocated within a cylinder $d$ by means of a crank $a$ and connecting rod $b$. Guided in the same cylinder and independent of the piston $c$ is a piston $e$ which is connected to the conveying trough $g$ by means of its piston rod $f$. The air cushion which is formed between the two pistons has the effect that by the movement of the first piston $c$, the second piston $e$ is likewise actuated. During the reciprocation of the piston $c$ a precisely synchronous and correct reciprocation of the piston $e$ with regard to the original position of equilibrium is obtained during the working. Moreover owing to the very considerable effects of the momentum of inertia which influence the piston $e$ this piston $e$ is subjected to a phase variation and to an increase of its stroke, with respect to the movement of the crank gear, since the piston $e$ which is actuated solely by the air cushion cannot follow the movements rapidly enough on account of the considerable resistance of momentum and friction influencing it.

Whereas therefore the first piston $c$ performs between the extreme positions $c'$ and $c^2$ a simple sinus-oscillation, the second piston $e$ is liable to perform a greater oscillation between the extreme positions $e'$ and $e^2$ with a corresponding phase displacement. This displacement of phase which is considerable necessitates that during a certain phase of each oscillation both pistons $c$ and $e$ are moved toward one another, that is to say approach one another, whereby the air cushion between them is strongly compressed. It is therefore clear that during this phase, the piston $e$ in aproaching its extreme position $e'$ is subjected to by far the strongest retarding forces, that is to say, this piston $e$ which together with the conveying trough and the material contained in the latter has already performed a considerable part of its stroke $e^2$ and $e'$, and has attained a high velocity, is very quickly retarded in the vicinity of the dead point $c'$, and thus rapidly brought to a standstill, and quickly thrown back again. This is illustrated in the diagram shown in Fig. 1$^a$.

The speed curves of the piston $c$ follow the course of a circle $c'$, $c^3$, $c^2$, $c^4$, since the piston $c$ performs a simple sinus-oscillation. The speed curves of the piston $e$ however follow the curve $e^2$, $e'$, $e^3$, $e^4$ in such manner that the movement about the dead point $e'$ is very quick, whereas about the dead point $e^2$ it is comparatively slow. This however is the characteristic feature of the so-called propeller movement corresponding to the prior patents of the same inventor.

With the conveying trough actuated in this manner, the material in the conveying trough moves in the direction of the arrow $h$ indicated in Fig. 1, because the trough is quickly brought to a standstill about the dead point $e'$, so that the material which in its movements along the path $e^2$, $e$ (Fig. 1$^a$) has assumed a corresponding speed, is caused to glide in the trough in forward direction. During the return stroke of the piston $e$ the trough is drawn back beneath the forwardly slipping material and returned to its initial position $e^2$. In connection with this mode of driving it should be observed that the piston $e$ moving entirely independently of the driving piston $c$ is in every instance under the influence of two driving forces without considering forces of friction and the momentum of inertia, namely of the pressure prevailing within the two cylinder chambers $i$ and $k$. The cylinder chamber $k$ therefore is made larger than the chamber $i$ in order to offer a lower pressure in the right-hand extreme position of the piston $e$ than the chamber $i$ in the other extreme position.

It is not necessary for the piston $e$ to move in the same cylinder as piston $c$, as said piston $e$ may be arranged in a separate cylinder $d^1$ which has a greater diameter than cylinder $d$ and which is immediately connected with the latter, see Fig. 4. In the illustrated form both cylinders consist of one piece. Cylinder $d^1$ could of course have a smaller diameter than cylinder $d$, if desired. According to the form illustrated in Fig. 5 a special piston $p$ moving in a corresponding cylinder $o$ is connected to the trough $g$; this piston $p$ offers an elastic resistance in the conveying-direction of the chute, in such a manner as to offer an elastic resistance in the other direction which would serve for moving the trough back to the zero-position. Instead of one piston $p$, several of them could be arranged if need be. The air-buffers could also be replaced by springs $q$ appropriately adjusted between the trough and the solid support, (see Fig. 6). In the forms shown in Figs. 4 and 5, the cylinder-heads have been omitted, so that only one air-cushion acts in each instance. Further, a circulation conduit $l$ may, if necessary, be provided for the purpose of equalizing or supplementing air losses in the compression chamber in the central position of the piston $e$ in which the pressures would be equal at both sides. Arranged in the walls or cover of the cylinder or of the piston are moreover equalizing or check valves, and the like, for the purpose of supplementing air losses in the cylinder chambers and controlling the pressures therein.

In the construction shown in Fig. 2, the cylinder $d$ is arranged on the trough $g$ so as to oscillate about a pivot $m$, whereas the piston $c$ is reciprocated by a crank gear $a$, $b$ as before. In this case no second piston is required, but the air cushion produced between the piston $c$ and the rear cylinder cover $n$ is utilized to directly bring about the oscillation of the conveying trough. Owing to the phase variation or displacement the piston $c$ and the cylinder cover $n$ approach each other during each oscillation, whereby the movement of the trough is strongly retarded toward the end. The material is therefore again moved in the direction of the arrow $h$. In this case the piston $c$ is so arranged that in the central position of the driving crank it is much closer to the rear cylinder cover $n$ than to the front cover.

According to the construction shown in Fig. 3, it is not the piston but the cylinder $d$ which is reciprocated by the crank gear $a$ $b$ so that it is displaced along the piston $c$ which is rigidly connected to the conveying trough $g$ by the rod $f$. The displacement of the phases between the oscillation of the cylinder and those of the piston has again for its effect that the piston $c$ and the cylinder cover $n$ are caused to approach one another during a determined phase of each oscillation, whereby the oscillation of the conveying trough is strongly retarded toward the end and thus brings about the conveying movement of the material.

Having now particularly described and ascertained the nature of my said invention and in what manner the same is to be performed, I declare that what I claim is:

1. In conveying mechanism, in combination, a conveying trough, driving means, a driven member connected to said trough and an air cushion interposed between said means and said driven member to transmit the driving movement from said means to said member.

2. In conveying mechanism, in combination, a conveying trough, a driving member, a driven member connected to said trough and an air cushion interposed between said driving member and said driven member, said air cushion transmitting the motion of the former to the latter.

3. In conveying mechanism, in combination, a conveying trough, a cylinder, a driving piston within said cylinder, a driven piston within said cylinder and connected to said trough, and an air cushion interposed between said pistons to transmit the motion of the driving piston to the driven piston.

4. In combination with a reciprocating conveyer, means for driving the same, means for compressing air actuated by the conveyer as it moves in both directions and arranged so that the compressed air acts to accelerate the motion of the conveyer in both directions.

In testimony whereof I have signed my name to this specification in the presence of two subscribing witnesses.

HERMANN MARCUS.

Witnesses:
 OSCAR DEPNER,
 WILHELM SPERNAT.